(12) United States Patent
Lambrecht et al.

(10) Patent No.: US 12,630,759 B2
(45) Date of Patent: May 19, 2026

(54) UV-LED REACTIVE SOLUTION

(71) Applicant: Pest Tracks, Inc., Hollywood, FL (US)

(72) Inventors: Timothy John Lambrecht, Dania Beach, FL (US); Edgar Ambriz, Irvine, CA (US)

(73) Assignee: Pest Tracks, Inc., Hollywood, FL (US)

( * ) Notice: Subject to any disclaimer, the term of this patent is extended or adjusted under 35 U.S.C. 154(b) by 71 days.

(21) Appl. No.: 18/889,162

(22) Filed: Sep. 18, 2024

(65) Prior Publication Data

US 2025/0092305 A1     Mar. 20, 2025

Related U.S. Application Data

(60) Provisional application No. 63/539,377, filed on Sep. 20, 2023.

(51) Int. Cl.
*A01M 31/00* (2006.01)
*C09K 11/02* (2006.01)

(52) U.S. Cl.
CPC ......... *C09K 11/025* (2013.01); *A01M 31/002* (2013.01)

(58) Field of Classification Search
CPC ................................................ A01M 31/002
See application file for complete search history.

(56) References Cited

U.S. PATENT DOCUMENTS

| | | | | |
|---|---|---|---|---|
| 5,554,842 | A | * | 9/1996 | Connell .................... B07C 3/18 235/487 |
| 6,059,677 | A | * | 5/2000 | Breshears ................. F42B 6/04 473/581 |
| 7,426,888 | B2 | * | 9/2008 | Hunt ....................... F42B 12/38 102/513 |
| 7,488,267 | B2 | * | 2/2009 | Hunt ....................... F42B 12/50 473/581 |
| 2006/0044792 | A1 | * | 3/2006 | Dallas ....................... G01J 3/10 362/184 |
| 2018/0045400 | A1 | * | 2/2018 | Bushee ................. F21V 3/0625 |

FOREIGN PATENT DOCUMENTS

| | | | | | |
|---|---|---|---|---|---|
| CA | 2314163 | C | * | 9/2008 | |
| EP | 2848661 | A1 | * | 3/2015 | ............. C09D 11/50 |
| JP | 2008101146 | A | * | 5/2008 | |
| WO | WO-2023222594 | A1 | * | 11/2023 | ............. H04N 7/188 |

* cited by examiner

*Primary Examiner* — Christopher P Ellis
(74) *Attorney, Agent, or Firm* — Westman, Champlin & Koehler, P.A.; Amanda M. Prose

(57) ABSTRACT

A UV-LED solution comprising an optical brightener, a thickener, and glycerin. The solution can further comprise preservative(s), water and/or alcohol to aid in evaporation of the water or other carrier used for spray or brush application. The solution has adhesive properties, is colorless and odorless and visible when subject to UV light or black light. The solution can be used for tracking purposes, including tracking movement or presence of humans, animals, or pests as well as for temporary marking purposes, where locations, goods, or persons can be marked.

10 Claims, 2 Drawing Sheets

UV-LED REACTIVE SOLUTION

CROSS-REFERENCE TO RELATED APPLICATION

The present application claims priority to and the benefit of U.S. provisional application Ser. No. 63/539,377, filed on Sep. 20, 2023, the contents of which are hereby incorporated in their entirety.

SUMMARY

The present disclosure relates to a UV-LED reactive solution with adhesive properties.

An aspect of the present disclosure relates to a UV-LED solution comprising an optical brightener, a thickener, glycerin, and a preservative. The solution has adhesive properties, is colorless and odorless and visible when subject to UV light or black light.

In one or more embodiments, the solution further comprises isopropyl alcohol and water.

In one or more embodiments, the optical brightener is provided in the range of about 0.1% to 1.0% of the total solution, the thickener is provided in the range of about 0.1% to 1.0%, the glycerin is provided in the range of about 1.0% to 15% of the total composition, and the preservative is provided in the range of 0.1% to 1.0% of the total composition.

The thickener is Hydroxyethyl cellulose, Xanthan gum or combinations thereof.

The preservative comprises potassium sorbate, sodium benzoate, or combinations thereof.

The solution is an emulsion, suspension, or aerosol and is configured for spray or brush application.

Another aspect of the present disclosure relates to a method of tracking movement of a pest comprising spraying a UV-LED solution having adhesive properties and subject to illumination from UV light or black light application, where the spray remains on a surface for at least 24 hours after application allowing the pest to walk through the solution and carry the solution with each step to provide a trail visible for a selected duration of time lasting at least 12 hours, 24 hours or more.

The UV-LED solution comprises an optical brightener, a thickener, glycerin, and a preservative.

The optical brightener is provided in the range of about 0.1% to 1.0% of the total solution, the thickener is provided in the range of about 0.1% to 1.0%, the glycerin is provided in the range of about 1.0% to 15% of the total composition, and the preservative is provided in the range of 0.1% to 1.0% of the total composition.

DETAILED DESCRIPTION

Figure 1:
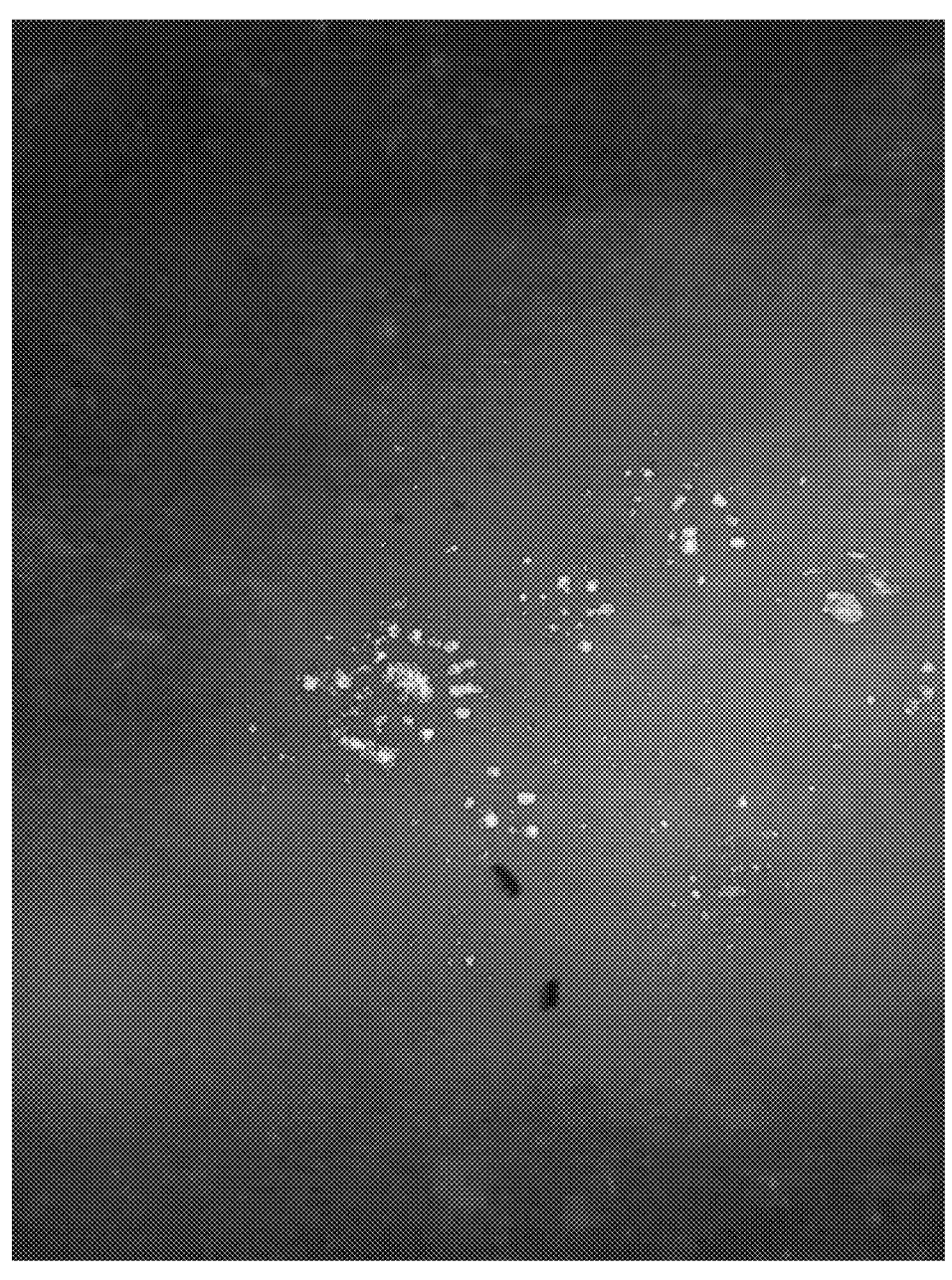
FIG. 1 illustrates the effectiveness of the solution according to one or more embodiments as illuminating tracks of an organism that walked over the solution.

Described herein is an UV-LED reactive composition with adhesive properties. The composition may be provided as a liquid solution for various uses, including but not limited to tracking. For example, the composition may be used for the purpose of tracking the movement of household pests, animals, or humans. The composition generally comprises a water soluble polymer, optical brightener, and a water soluble film former, and the composition is provided in solution with a solvent such as water. The composition may further comprise one or more of a preservative, emulsifier, or texturizer. The composition may further comprise various additives appropriate for the selected end use. In one or more embodiment the components are provided in liquid or gel form, in solution generally with water or deionized water.

In one or more embodiments, the composition comprises one or more water soluble polymers such as polyvinyl alcohol.

In one or more embodiments, the composition comprises one or more water soluble film formers such as hydroxyethyl cellulose.

In one or more embodiments, the composition comprises one or more optical brighteners.

In one or more embodiments, the composition comprises an aerosol carrier for spraying the solution, a sweetener, a compound for extending dry time, or combinations thereof such as propylene glycol.

In one or more embodiments, the composition includes one or more active ingredients described herein in solution. The solution may comprise deionized water for diluting the components to a selected concentration effective for the selected end-use.

In one or more embodiments the composition may optionally further comprise one or more additives such as attractants, stabilizers, colorings or the like.

The composition may be provided in a liquid solution form for application. The composition may also be provided in the form of a liquid base with an increased viscosity, for example as gel of various viscosities. In one or more embodiments, the composition is provided with a consistency and viscosity allowing the composition to be sprayed, misted, pumped or the like for application. The solution may also be provided as an aerosol.

The composition once applied to a non-porous or semi-porous surface maintains a wet consistency and has a tackiness that can be maintained for at least 24 hours after application and exposure to air.

In one or more embodiments, the composition is colorless and substantially invisible. What is meant by invisible is that the composition as applied to a surface is not visible to the naked eye and may only be visible when illuminated with a black light or the like.

In one or more embodiments, the composition is a UV-LED reactive composition.

In one or more embodiments, the composition may evaporate and in some embodiments may partially or substantially evaporates at a time after 48 hours or more than 72 hours from of application. The application can wiped clean, leaving behind substantially no residue.

The composition may be mostly odor and/or scent free. However, in one or more non-limiting embodiment, the composition may further comprise an attractant for selected pests, rodents ranging from ants to mice or larger pests, and thus the composition may include a scent or taste attractive to the selected pests or rodents.

The composition may be a natural or plant-based composition wherein at least 95% of the components are natural and/or plant based and in some embodiments the composition is about 98-99% natural or plant-based. The composition may be considered safe and non-toxic to humans, pets and the pests which are being tracked.

One or more stabilizers may be added to the composition, however, the composition may be considered to have a shelf life of least one year when stored in a plastic or glass container.

In one or more non-limiting embodiments the solution described herein a composition for use in pest control. The composition may be used for "proactive" pest control. Use of the composition in pest control applications eliminates the need for traps and other reactive measures taken after an infestation such as of mice and other rodents. The composition may be a tracking composition, allowing pest control companies, home owners, property owners or caretakers, or others to track the animals. As it is generally difficult to pinpoint where a specific pest enters a structure such as a house, use of compositions according to one or more embodiments herein allows a user to track the animal and locate an entry or exit point or other location. Applying the composition, such as by spraying the composition, is carried out around a perimeter (inner or outer perimeter or combination thereof). The animals generally track through the applied composition, thereby leaving a track or trail to and from their point of entry, nest, exit or other location. In order for a pest control company or homeowner to follow the track or trail of composition, a UV lamp or "black light" can be used to illuminate the track or trail. Generally, the track or trail will be visible by black light upon application and in the range of at least 24 to 48 hours or more. Once located a user can then seal off or otherwise remediate the gathering point, entry point, attractive area or other to prevent further animal entrance or infestation.

The composition is generally provided as a liquid, solution, suspension, emulsion, or aerosol for example allowing the composition in use to be sprayed for application. The composition is essentially invisible to the naked eye, but also is somewhat sticky and/or tacky in an amount sufficient to stick to the animal's feet or other body locations and transfer to the surface on which the animal moves. The composition is non-toxic and safe for pets and children once sprayed.

In general the composition comprises an optical brightener, thickener, glycerin, and a preservative based on a weight % of the total composition. For example, the optical brightener may be provided in the range of about 0.001% to 10%, in the range of about 0.01 to 1.0% or more preferably in the range of about 0.1% to 0.5% and in some embodiments provided in amount that is about 0.3% of the total composition. The thickener or combinations of thickeners may be provided in amount in the range of about 0.01% to 10.0%, or more preferably in the range of about 0.1 to 1.0% or more preferably and in some embodiments provided in amount that is about 0.1%, 0.2%, 0.3% or more of the total composition. Glycerin can be provided in an amount ranging from 1.0% to 20% or more preferably in an amount in the range of 5% to 15%, or more preferably at about 10% of the total composition. Additional components may include one or more preservatives which can be provided in an amount in the range of 0.01% to 2.0%, or more preferably in the range of 0.1% to 1.0% or less of the total composition. Additional components may include isopropyl alcohol or other alcohols and the composition may be provided in water as the remaining component.

In one exemplary embodiment the composition comprises polyvinyl alcohol, an optical brightener, propylene glycol, and hydroxyethyl cellulose in deionized water. The solution may comprise up to 90 parts or more of water and the active ingredients provided in combination of 0.1 to 10, 20, 30, 40 total parts or more of the solution. For example, the solution may comprise about 0.1 to about 10 parts of polyvinyl alcohol, about 0.1 to about 10 parts of optical brightener, about 0.1 to about 10 parts of propylene glycol, and about 0.1 to about 10 parts of hydroxyethyl cellulose, and about 60 to about 96.4 parts of solvent such as DI water.

The amounts of components can deviate from the ranges provided above in order to further customize the formulation. For example, the amount of glycerin may be increased and/or polyvinyl alcohol added to the solution in order to increase the stickiness or tackiness of the formula to increase the carrying of the composition once deposited. If adding polyvinyl alcohol, the amount may be in the range of about 0.5% to 2% of the total composition. For example, to increase the amount collected by feet of the organism that is in contact with the composition. Similarly, these amounts can be decreased in order to reduce the amount carried from one surface to another.

As noted above, components can be included in the composition to reduce the drying or evaporation time of the inactive carrier ingredients used for spray or brush application. In some embodiments, isopropyl alcohol or methanol can be added to the composition in the amount ranging from about 1% to about 15% of the total composition (e.g., water may be replaced with an amount of isopropyl alcohol, methanol, or the like or combinations thereof). In contrast, to extend the drying time the amount of glycerin can be increased for example in the range of about 1% to about 15% or more.

| EXAMPLE COMPOSITIONS | |
| --- | --- |
| | Weight (%) |
| Example 1 | |
| Optical Brightener | 0.30 |
| Hydroxyethyl cellulose | 0.20 |
| Glycerin | 10.00 |
| Potassium Sorbate | 0.35 |
| Sodium Benzoate | 0.35 |
| Water | 88.8 |
| Example 2 | |
| Optical Brightener | 0.30 |
| Xanthan gum | 0.10 |
| Glycerin | 10.00 |
| Potassium Sorbate | 0.35 |
| Sodium Benzoate | 0.35 |
| Water | 88.9 |
| Example 3 | |
| Optical Brightener | 0.30 |
| Hydroxyethyl cellulose | 0.20 |
| Glycerin | 10.00 |
| Potassium Sorbate | 0.35 |
| Isopropyl Alcohol | 10.00 |
| Sodium Benzoate | 0.35 |
| Water | 78.8 |

The compositions according to one or more embodiments described herein are safe and non-toxic.

Figure 2:
FIG. 2 illustrates the effectiveness of the solution according to one or more embodiments as illuminating tracks of an organism that walked over the solution, visible only under UV light.

In referring to the figures, FIGS. 1 and 2 illustrate the effectiveness of the solution as applied to a surface where a rodent or the like may walk. The solution adheres to the feet or other parts of the rodent that touch the ground (e.g., tail) and is deposited in areas where the rodent travels and were not sprayed previously. The tracks can then be followed by way of illumination with UV light.

Additional uses of the composition include in the toy sports industry. As the composition is safe for pets and children, the composition could be integrated into paint balls and the like as well as have applications in the security industry. The composition is safe and non-toxic with respect to humans and pets and thus this composition is safe if ingested by an animal.

Additional uses of the composition include physical security uses such as hand/foot tracking.

Although the present disclosure has been described with reference to preferred embodiments, workers skilled in the art will recognize that changes may be made in form and detail without departing from the spirit and scope of the disclosure.

The invention claimed is:

1. A UV-LED solution comprising:
an optical brightener;
a thickener;
glycerin; and
a preservative,
wherein the solution has adhesive properties, is colorless and odorless and only visible when subject to UV light or black light.

2. The solution of claim 1 and further comprising isopropyl alcohol and water.

3. The solution of claim 1 wherein the optical brightener is provided in the range of about 0.1% to 1.0% of the total solution, the thickener is provided in the range of about 0.1% to 1.0%, the glycerin is provided in the range of about 1.0% to 15% of the total composition, and the preservative is provided in the range of 0.1% to 1.0% of the total composition.

4. The solution of claim 1 wherein the thickener is Hydroxyethyl cellulose, Xanthan gum or combinations thereof.

5. The solution of claim 1 wherein the preservative comprises potassium sorbate, sodium benzoate, or combinations thereof.

6. The solution of claim 1 wherein the solution is an emulsion, suspension, or aerosol and is configured for spray application.

7. The solution of claim 1 wherein the solution is non-toxic.

8. A method of tracking movement of a pest comprising spraying a UV-LED solution having adhesive properties and visible only when subject to illumination from UV light or black light application, where the spray remains on a surface for at least 24 hours after application allowing the pest to walk through the solution and carry the solution with each step to provide a trail visible for a selected duration of time lasting at least 12 hours, 24 hours or more.

9. The method of claim 8 wherein the UV-LED solution comprises an optical brightener, a thickener, glycerin, and a preservative.

10. The method of claim 9 wherein the optical brightener is provided in the range of about 0.1% to 1.0% of the total solution, the thickener is provided in the range of about 0.1% to 1.0%, the glycerin is provided in the range of about 1.0% to 15% of the total composition, and the preservative is provided in the range of 0.1% to 1.0% of the total composition.

* * * * *